(12) United States Patent
Gupta et al.

(10) Patent No.: US 10,949,794 B2
(45) Date of Patent: Mar. 16, 2021

(54) DEVICE AND METHOD FOR PRODUCT DELIVERY INTERCEPTION

(71) Applicant: Mastercard International Incorporated, Purchase, NY (US)

(72) Inventors: Ashutosh Kumar Gupta, Benares (IN); Nishant Maheshwari, Aligarh (IN); Ajay Nehra, Gurgaon (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 290 days.

(21) Appl. No.: 15/993,403

(22) Filed: May 30, 2018

(65) Prior Publication Data

US 2018/0349851 A1 Dec. 6, 2018

(30) Foreign Application Priority Data

May 30, 2017 (SG) .............................. 10201704415S

(51) Int. Cl.
*G06Q 30/06* (2012.01)
*G06Q 10/08* (2012.01)
*G06Q 30/08* (2012.01)

(52) U.S. Cl.
CPC ..... *G06Q 10/08355* (2013.01); *G06Q 10/087* (2013.01); *G06Q 30/0625* (2013.01); *G06Q 30/0639* (2013.01); *G06Q 30/08* (2013.01)

(58) Field of Classification Search
CPC ........... G06Q 10/08355; G06Q 10/087; G06Q 30/06–30/0645; G06Q 30/08; G06Q 50/01

See application file for complete search history.

(56) References Cited

U.S. PATENT DOCUMENTS

| 10,043,148 | B1* | 8/2018 | Chowdhary | ....... G06Q 10/0833 |
| 2005/0177443 | A1* | 8/2005 | Rodriguez | ............. G06Q 30/08 705/26.3 |
| 2013/0332292 | A1 | 12/2013 | Angert et al. | |
| 2016/0071050 | A1* | 3/2016 | Kaye | .................... G06Q 10/083 705/15 |
| 2018/0174093 | A1* | 6/2018 | Perez | ............... G06Q 10/08355 |

FOREIGN PATENT DOCUMENTS

EP    1711920    10/2006

OTHER PUBLICATIONS

Christoffersen, "Vote Trading and Information Aggregation," The Journal of Finance, University of Pennsylvania, 62(2), pp. 2897-2929, Jan. 20, 2005. (Year: 2005).*

(Continued)

*Primary Examiner* — Adam L Levine

(57) ABSTRACT

Herein disclosed is a method and system to perform product delivery interception. In one implementation, a product delivery interceptor receives, from a purchaser, a request to determine availability of a product. The product delivery interceptor identifies a recipient of the product and transmits a bid for the product for consideration by the recipient. The product delivery interceptor acquires the recipient response to the bid and conveys an instruction to reroute delivery of the product to the purchaser if the recipient response indicates acceptance of the bid.

20 Claims, 11 Drawing Sheets

(56) References Cited

OTHER PUBLICATIONS

PCT International Search Report and Written Opinion from PCT Application No. PCT/US2018/028504 entitled Device and Method for Product Delivery Interception (dated Jun. 12, 2018).
Tang, Xiaofan, "International Preliminary Report on Patentability" Application No. PCT/US2018/028504, dated Dec. 12, 2019, 10 pages.

* cited by examiner

DEVICE AND METHOD FOR PRODUCT DELIVERY INTERCEPTION

CROSS REFERENCE TO RELATED APPLICATION

This application claims priority to Singapore Application Serial No. 10201704415S, filed May 30, 2017, which is incorporated herein by reference in its entirety

FIELD OF INVENTION

The present disclosure relates to a device and method for product delivery interception.

BACKGROUND

The availability of online shopping and its growing acceptance trend has shaped consumer purchasing habits. Two types of consumers have been identified.

The first type of consumer looks for best prices. He or she is open to options that can help to reduce the cost of a wanted product.

The second type of consumers are those who are impatient when a product is urgently needed. Such consumers are willing to pay extra for early deliveries. For example, a consumer who wants a mobile phone is ready to pay more for expedited delivery.

A need therefore exists to find possible solutions that meet the needs of the above two consumer types.

SUMMARY

According to a first aspect, there is provided a product delivery interceptor including: at least one processor; at least one memory including computer program code; an input port coupled to the processor, the input port configured to receive, from a purchaser, a request to determine availability of a product; and an output port coupled to the processor, the output port configured to transmit a bid for the product, the bid resulting from confirmation of the availability of the product, in response to the received request; the at least one memory and the computer program code configured to, with the at least one processor, cause the product delivery interceptor to: identify a recipient of the product; transmit, through the output port, the bid for consideration by the recipient; acquire, through the input port, the recipient response to the bid; and convey, through the output port, an instruction to reroute delivery of the product to the purchaser if the recipient response indicates acceptance of the bid.

According to a second aspect, there is provided a product delivery interceptor including: at least one processor; at least one memory including computer program code; an input port coupled to the processor, the input port configured to receive a notification that a product is to be delivered to a recipient; and an output port coupled to the processor, the output port configured to transmit a bid for the product, the at least one memory and the computer program code configured to, with the at least one processor, cause the product delivery interceptor at least to: identify a purchaser of the product; forward, through the output port, the notification to the purchaser; receive, through the input port, the bid from the purchaser; transmit, through the output port, the bid for consideration by the recipient; acquire, through the input port, the recipient response to the bid; and convey, through the output port, an instruction to reroute the delivery of the product from the recipient to the purchaser if the recipient response indicates acceptance of the bid.

According to a third aspect, there is provided a product delivery interception method including: receiving, from a purchaser, a request to determine availability of a product; identifying a recipient of the product; transmitting a bid for the product for consideration by the recipient; acquiring, the recipient response to the bid; and conveying an instruction to reroute delivery of the product to the purchaser if the recipient response indicates acceptance of the bid.

According to a fourth aspect, there is provided a product delivery interception method including: forwarding, to a purchaser, a notification that a product is to be delivered to a recipient; receiving, from the purchaser, a bid for the product; transmitting the bid for consideration by the recipient; acquiring the recipient response to the bid; and conveying an instruction to reroute the delivery of the product from the recipient to the purchaser if the recipient response indicates acceptance of the bid.

BRIEF DESCRIPTION OF THE DRAWINGS

Embodiments will be better understood and readily apparent to one of ordinary skill in the art from the following written description, by way of example only, and in conjunction with the drawings, in which.

DETAILED DESCRIPTION

Overview

Figure 1:
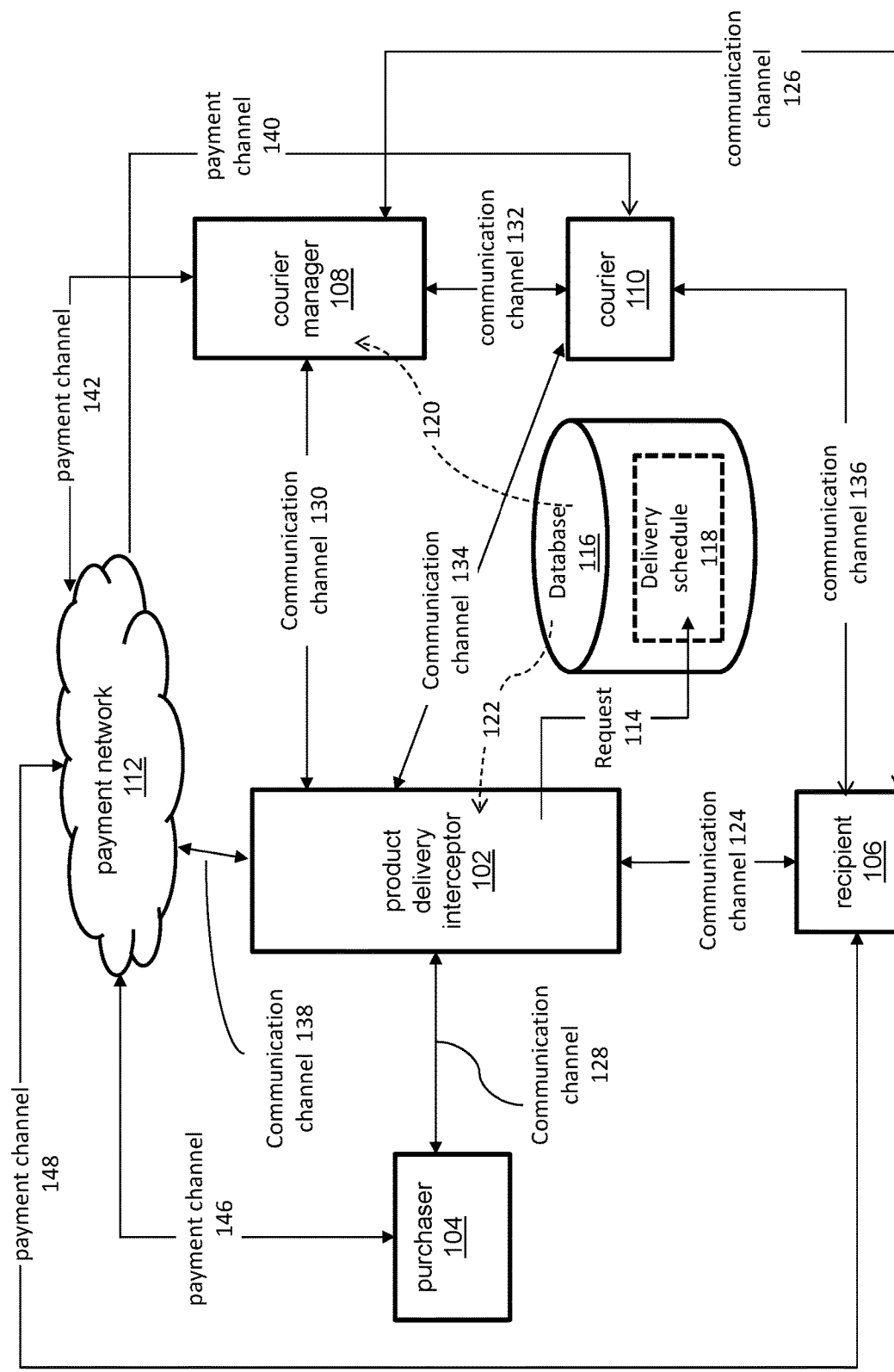
FIG. 1 shows a schematic of a system which may be used to support product delivery interception.

Various embodiments of present disclosure provide a method and a system that enables a recipient of a product to be contacted by a purchaser who is notified about the product being delivered to the recipient. The recipient includes a first user who ordered the product from an online or an offline store. The purchaser includes a second user who either ordered the same product or another product that is substantially similar or has some association with the product being delivered to the recipient. Alternatively, the purchaser may not yet have ordered the product and discovers that a product being delivered to a recipient is desired.

If the purchaser is unable to wait for scheduled delivery of the product or the purchaser wants to be aware of product delivery in the vicinity, the purchaser uses an application installed in an electronic computing device (such as a smartphone) to interrogate a database that provides a delivery schedule having details such as the product being delivered, the recipient address and the delivery date. This database is queried by a product delivery interceptor to which the application accesses. The product delivery interceptor will then return to the application the results of the query, whereby the purchaser will be informed of products being delivered to a recipient.

The purchaser will use the application to make a bid for a product being delivered to the recipient, which triggers the product delivery interceptor to send the bid to a corresponding application installed in an electronic computing device (such as a smartphone) of the recipient. The recipient reviews the bid from the purchaser for the product, this bid typically providing a monetary amount over the price that the recipient has paid for the product. The bid may also include an offer to exchange the product with a product that the purchaser has ordered, in which case the monetary amount in the bid is lower compared to if the purchaser does not have a product to exchange with the recipient.

If the recipient accepts the bid through the corresponding application in the recipient's electronic computing device, the application in the purchaser's electronic computing device receives the approval. The recipient's product is not delivered to the recipient, but rerouted to the purchaser. If the purchaser's product was offered for exchange and accepted, then the purchaser's product is rerouted to the recipient, where the recipient is informed of the delivery date of the exchanged product, which would likely be a delay compared to the scheduled delivery date of the original product. Upon acceptance of the bid, the purchaser will then be billed an amount to cover the payment to the recipient and also payment to the distribution channel (i.e. the parties involved in the delivery) facilitating rerouting of the product from the original recipient to the purchaser. The amount that the purchaser is billed depends on whether the recipient accepts the purchaser's product.

The following disclosure thus provides advantages, such as shortening the waiting time to receive a product. That is, should the purchaser chance upon a wanted product, the purchaser can pay a premium to receive the product without having to wait for delivery to be arranged by a merchant selling the product, provided that the product is being delivered to a recipient. If the purchaser has already ordered the product, the purchaser can receive the product sooner than its scheduled delivery date, by paying a premium for the recipient's product. A shortened waiting time possibly increases sales for online merchants, since a purchaser, who is in urgent need of a product, may simply purchase from a retailer which has the product in stock. This is especially the case for cash and carry goods. As for the recipient, the acceptance of the bid would mean paying less for a wanted product, in lieu of a delay for receiving the product.

Terms Description In Addition to Dictionary Meaning of Terms

Product delivery interception refers to a scenario where there is a product scheduled for delivery to a receiving party and another party, who wants that product or something similar, expresses his interest to the recipient. Should the receiving party agree, the product is delivered to the other party, rather than to the original receiving party. The product may already be on route to the original receiving party or it may simply be timetabled for delivery.

Recipient refers to the original receiving party mentioned above with respect to product delivery interception, i.e. the receiver of a product who is contacted on whether he or she is willing to let the product, originally intended for him or her, be delivered to the other party instead.

The purchaser refers to the other party mentioned above with respect to product delivery interception, i.e. a person who is determining whether there is a party who is receiving something that is the same or similar to a desired product.

It will be appreciated that which term "product" or the "same or similar product" is associated with the purchaser or the recipient depends on the point of reference. For example, if a discussion begins with the purchaser seeking to determine whether a product he wants is being delivered to a recipient, it is then determined whether there is available for interception a same or similar product to the recipient. On the other hand, if the discussion begins with a product being delivered to the recipient, it is then determined whether interception will occur from a same or similar product being requested by a purchaser.

The product delivery interceptor is a server terminal or part of a system that is used to host a program that facilitates the product delivery interception. This program has instructions that, when executed, cause the product delivery interceptor to perform a sequence of steps where data is processed that brings about product delivery interception. This data may be obtained from external devices, processed by the product delivery interceptor and then returned to the same or different external devices. Thus terms like "identify", "transmit", "acquire", "convey", "provide", "receive", "assign" and "forward" refer to communication with these external devices to obtain the data required to bring about the product delivery interception.

The bid refers to an offer to acquire the product, for delivery to the recipient, where the bid communicates the intention from the purchaser to obtain the recipient's product and provides the terms of the acquisition to the recipient, such as exchanging it for the product that the purchaser has ordered but delivered at a later date, along with suitable monetary compensation.

Examples of the product include a good, service or a combination of both. Examples of a good include bulky items (like television sets, refrigerators, furniture) or compact items (sundries, handheld appliances, groceries) or any other good. Examples of services include massages, cleaning, babysitting, pest control or any other service. An example of a product that has both good and service components include food catering with waiting staff.

Exemplary Embodiments

Embodiments of the present invention will be described, by way of example only, with reference to the drawings. Like reference numerals and characters in the drawings refer to like elements or equivalents.

FIG. 1 shows a schematic of a system 100 which is used to support product delivery interception, in accordance with an embodiment of present disclosure.

Hardware Description

The system 100 has a product delivery interceptor 102, a purchaser 104, a recipient 106, a courier manager 108, a courier 110 and a payment network 112. The purchaser 104 communicates with the product delivery interceptor 102 over a communication channel 128 and communicates with the payment network 112 over a payment channel 146. The product delivery interceptor 102 communicates with the payment network 112 over a communication channel 138, with the courier manager 108 over a communication channel 130 and with the recipient 106 over a communication channel 124. The product delivery interceptor 102 may also communicate directly with the courier 110 over a communication channel 134, instead of through the courier manager 108. The recipient 106 communicates with the payment network over a payment channel 148, with the courier manager over a communication channel 126 and with the courier 110 over a communication channel 136. The courier manager 108 communicates with the payment network 112 over a payment channel 142 and with the courier 110 over a communication channel 132. The courier 110 communicates with the payment network 112 over a payment channel 140. It will be appreciated that any one or more of the communication channels and the payment channels may be a wired or wireless connection.

The product delivery interceptor 102 may be implemented as one or more server terminals that support product delivery interception. The product delivery interceptor 102 is in electrical communication with both the purchaser 104 and the recipient 106 to receive data streams from both of these parties. These data streams provide the product delivery interceptor 102 with the necessary data for its programmed logic to perform administration of the product delivery interception. The product delivery interceptor 102 is in one embodiment a component of a merchant system from which the recipient 106 purchases a product. The product delivery interceptor 102 is in another embodiment a component of a separate service provider to which a merchant provides order data and delivery data for the service provider system to manage.

Communication between the product delivery interceptor 102 and the recipient 106 is over a channel 124 and with an electronic computing device accessible by the recipient 106. Similarly, communication between the product delivery interceptor 102 and the purchaser 104 is over a channel 128 and with an electronic computing device accessible by the purchaser 104. Thus, for simplicity, any mention of communication with the purchaser 104 or the recipient 106 refers to data being sent to and received by the electronic computing device accessible by the purchaser 104; and the electronic computing device accessible by the recipient 106 respectively. This electronic computing device may be a mass market consumer product like a laptop computer, smartphone, smartwatch or a tablet. The electronic computing device accessible by either the purchaser 104 or the recipient 106 typically runs an operating system. The operating system may host one or more applications, including one that is configured to communicate with the product delivery interceptor 102 and facilitate the process of product interception by providing the purchaser 104 with information on product delivery to recipients 106 and allowing the purchaser 104 to make a bid to one or more of the recipients 106. A further application includes a digital wallet used to interface with the payment network 112 to send payment from the purchaser 104 to the recipient 106 and for the recipient 106 to receive the payment upon acceptance of the bid. Another application provides an interface that advertises products offered by a merchant where at the purchase page, the merchant informs the purchaser 104 that the ordered product is scheduled for delivery to a recipient 106 and enquires whether the purchaser 104 wants to make a bid for the recipient's 106 product, so as to secure earlier delivery. If so, the merchant application then opens the product interception application. Alternatively, all functionality of these three applications are integrated into a single application.

The courier manager 108 serves to co-ordinate delivery operations made by the courier 110. The courier manager 108 acts as a dispatch base for receiving updates on the delivery by the product delivery interceptor 102 and passing them on to the courier 110 assigned with the delivery.

The courier 110 may be allocated a tracking terminal through which information on the delivery is fed by the product delivery interceptor 102. Alternatively, the product delivery interceptor 102 can directly communicate with the courier 110, whereby the communication may be with an electronic computing device owned by the courier 110, this electronic computing device being similar to the one owned by the purchaser 104 and the recipient 106. That is, the electronic computing device owned by the courier 110 is a mass market consumer product like a laptop computer, smartphone, smartwatch or a tablet hosting an application that is configured to communicate with the product delivery interceptor 102. Accordingly, any mention of data communication with the courier 110 refers to data communication with its tracking terminal or its electronic computing device.

The payment network 112 is a card scheme network used to support electronic payment that occurs during product delivery interception. An example would be the four party model from MasterCard® for processing electronic payment made using their financial systems and is thus not further elaborated.

Functional Description

The following describes possible approaches that allow for a purchaser 104 who has already ordered a product or is keen on ordering a product to determine whether that product, or something similar, is on schedule for delivery to a recipient 106. The purchaser 104 may be on a payment page for the product on a merchant website, which then prompts the purchaser 104 that the product is planned for delivery to a recipient 106 and requests whether the purchaser 104 would like to make a bid for the recipient's 106 product, instead of following through with payment. Alternatively, for the purchaser 104 who is in sudden urgent need of an already purchased product, the purchaser 104 can start a product interception application to check whether the product is planned for delivery to a recipient 106 and make a bid for the recipient's 106 product.

Products that are planned for delivery to one or more recipients 106 are kept in a delivery schedule 118. This delivery schedule 118 is populated whenever the recipients 106 make a product order. The system 100 provides for a database 116 supporting the delivery schedule 118 that keeps a record of products that are to be delivered, a timetable of their delivery and their intended recipient 106. The database 116 also archives product data information, such as a category (e.g. kitchen appliance, detergent, electronics) and a sub-category (e.g. for kitchen appliance: pots, pans, stove and hood; for detergent: dishwashing, clothes, floor and bleach; for electronics: television set, microwave, blender and air conditioner) under which the product falls, model number, brand, colour and year of manufacture of the product. When the product delivery interceptor 102 receives a request 114 to determine availability of a product from the purchaser 104, the request 114 is processed against the delivery schedule 118. The request 114 contains product information, such as the brand and model of the product. The product information may also include a picture of the product wanted by the purchaser 104, whereby the product delivery interceptor 102 will then run an image recognition algorithm to identify the brand and the model of the product. The delivery schedule 118 is then interrogated with the received product information in the request 114 to locate the requested product or something similar. If the product information archive of the database 116 contains a product order having product data information that matches the received product information in the request 114, the database 116 then has records of an identical product that is ordered by the recipient 106. On the other hand, if there is no such match, the product delivery interceptor 102 will then determine whether there is an order for a similar product. Such a similar product may be identified by locating one or more of the category, the sub-category, brand and model number under which the product of the request 114 falls. One or more product orders in the database 116 which belongs to one or more of the located category, the sub-category, brand and model number are then identified as possible similar products to the product sought by the purchaser 104 in the request 114. Detail of these possibly similar products may then be returned to the purchaser 104 and ranked, for example, with the similar product, with a comparable branding to that of the product wanted by the purchaser 104, presented first. The result of the interrogation is then returned to the purchaser 104, i.e. whether a same or similar product is available.

A merchant (not shown) may assist to send the request 114 in offline purchase scenarios where the purchaser 104 orders a product over the telephone, rather than through a merchant application or over a merchant website. In such scenarios, a telephone operator or an automated telephone answering service undertakes the sending of the request 114 and reports the result of the interrogation to the purchaser 104. The telephone operator then assists with making the bid to the recipient 106 and reporting acceptance of the bid from the recipient 106 to the purchaser 104

In the embodiment where the product delivery interceptor 102 maintains the database 116 (depicted using the dotted arrow 122), the request 114 and the response to the request are directly processed, since the database 116 is internally located. Alternatively, the database 116 may be maintained in the courier manager 108 (depicted using the dotted arrow 120) with which the product delivery interceptor 102 is in electrical communication over the channel 130. The product delivery interceptor 102 initiates the interrogation of the delivery schedule 118 by forwarding the request 114 to the courier manager 108. After the courier manager 108 obtains the result of the interrogation from its database 116, the product delivery interceptor 102 receives the response to the request 114 from the courier manager 108. The response is returned to the purchaser 104, i.e. whether a same or similar product is available.

After confirming that a same or similar product is available (as a result of receiving the request 114), the product delivery interceptor 102 interrogates the delivery schedule 118 to identify a recipient 106 of a product that is the same or similar to the product to which the purchaser 104 has interest (i.e. the product being the subject of the request 114). The identification of the recipient 106 is to determine whether product interception can be executed, that is whether there is a party willing to consider a bid from the purchaser 104 for the same or similar product that the recipient is scheduled to receive. As mentioned above, the bid refers to an offer to acquire this product under certain conditions or terms. The identification of the recipient 106 may be before the product delivery interceptor 102 receives the bid from the purchaser 104, i.e. immediately upon receipt of the request 114, or after the bid is received from the purchaser 104. In either case, the bid results from confirming that the same or similar product is available. When the purchaser 104 is notified of such availability, the purchaser 104 is invited to make a bid for the same or similar product. The product delivery interceptor 102 may automatically create starting terms for the bid, such as a monetary amount that is at least commensurate with the value of the same or similar product. The purchaser 104 may then change the terms before proceeding to finalise the bid. Upon finalisation, the product delivery interceptor 102 will receive the bid from the purchaser 104.

After receiving the bid, the product delivery interceptor 102 transmits the bid for consideration by the recipient 106. Transmission of this bid to the recipient 106 may be: a) direct (via the communication channel 124); b) via the courier manager 108 (i.e. first through communication channel 130 between the product delivery interceptor 102 and the courier manager 108, then through communication channel 126 between the courier manager 108 and the recipient 106); c) via the courier 110 (i.e. first through communication channel 134 between the product delivery interceptor 102 and the courier 110, then through communication channel 136 between the courier 110 and the recipient 106); or d) through one or more routers (not shown). This notifies the recipient 106 of the request 114 made on the product which is being delivered. The recipient 106 is informed of the content of the bid, such as the terms of the offer for the product. A time duration for the product delivery interceptor 102 to receive a response, from the recipient 106, to the bid may be initiated. If no response is received after this duration, the product delivery interceptor 102 will assume that the recipient 106 is not interested in the bid and will convey the non-interest to the purchaser 104. On the other hand, should the recipient 106 reply within this time duration, the response of the recipient 106 to the bid is acquired by the product delivery interceptor 102, using the communication path over which the bid was transmitted (i.e. either: a) through the communication channel 124); b) through the communication channel 126, then through the communication channel 130; c) through the communication channel 136, then through the communication channel 134). The recipient 106 response to the bid, or the non-response, may then be returned by the product delivery interceptor 102 to the purchaser 104 via the communication channel 128. Should the recipient response indicate acceptance of the bid, the product delivery interceptor 102 conveys an instruction to reroute delivery of the same or similar product from the recipient 106 to the purchaser 104. Before this instruction to reroute delivery is conveyed, final authorisation may be requested from the purchaser 104, such as at the instance when the product delivery interceptor 102 returns the recipient 106 response.

In illustrated embodiment of product delivery interception involving product exchange, the purchaser 104 has already ordered the product being the subject of the enquiry 114. The bid for the same or similar product for delivery to the recipient 106 then includes an offer to exchange the same or similar product with the product ordered by the purchaser 104. This exchange offer is included with a rebate to the recipient 106. In one implementation, this rebate is a monetary amount which can be viewed as a discount on the sum that the recipient 106 paid for the same or similar product. This is because the ordered product is typically delivered to the purchaser 104 later than when the same or similar product is delivered to the recipient 106. Thus, the rebate provides an incentive to the recipient 106 for accepting the bid from the purchaser 104, whereby the recipient 106 gets a monetary amount from the purchaser 104 for agreeing to a delivery delay, since the recipient 106 receives the product originally intended for the purchaser 104. This discount is provided in the form of credit into a bank account if payment has already been made for the product that was originally intended for the purchaser 104. In the scenario where the ordered product by the purchaser 104 is different from the product bought by the recipient 106 and is cheaper, the bid includes a monetary compensation to at least cover the cost difference. This monetary compensation is in addition to the rebate for agreeing to take receipt at a later date. If the bid from the purchaser 104 is accepted by the recipient 106, the product delivery interceptor 102 will receive an appropriate message from the recipient 106. The message is returned to the purchaser 104 for final confirmation or the product delivery interceptor 102 generates, upon receipt of the acceptance of the bid, an instruction to reroute delivery of the product ordered by the purchaser 104 to the recipient 106.

While the product delivery interceptor 102 coordinates product delivery interception, product delivery is performed by a courier 110 to the purchaser 104, the recipient 106 or both. The courier 110 thus acts as a delivery agent. In the scenario where the purchaser 104 makes a bid for a product or something similar to the recipient 106, the same or similar product is delivered by the courier 110 to the recipient 106. If the recipient 106 agrees to the bid, then the courier 110 will deliver the same or similar product to the purchaser 104. Further, if the purchaser 104 has already ordered a product, the courier 110 delivers the ordered product to the recipient 106, instead of to the purchaser 104, so that the courier 110 performs delivery to both the recipient 106 and the purchaser 104. On the other hand, if the recipient 106 does not agree to the bid made by the purchaser 104, then the same or similar product remains on its original delivery schedule to the recipient 106. The instruction to reroute the delivery of the same or similar product and the instruction to reroute the delivery of the ordered product are transmitted to the courier 110.

When courier 110 operations are coordinated by the courier manager 108 over communication channel 132, a record of the recipient 106 is kept in the courier manager 108, the record providing details such as the recipient 106 address, name and contact information. The product delivery interceptor 102 then communicates with the courier manager 108 to perform one or more of: the identification of the recipient 106; the transmission of the bid for consideration by the recipient 106, the bid being made by the purchaser 104 to acquire the product that is to be delivered to the recipient 106; the conveyance of the instruction to reroute the delivery of the product from the recipient 106 to the purchaser 104; and the conveyance of the instruction to reroute the delivery of the product ordered by the purchaser 104 to the recipient 106.

The recipient 106 is not the only party that is remunerated for participating in the product delivery interception. The parties that are involved in the delivery process, such as the courier manager 108 and/or the courier 110 also receives a monetary incentive for facilitating the product delivery interception. For example, in the case where the courier manager 108 coordinates the product delivery, the product delivery interceptor 102 provides, to the courier manager 108, an indication of remuneration for one or more of: the reroute of the delivery of the same or similar product from the recipient 106 to the purchaser 104; and the reroute of the delivery of the ordered product from the purchaser 104 to the recipient 106. This indication of remuneration to the courier manager 108 may be provided at the time when the courier manager 108 receives, over the communication channel 130, the bid from the product delivery interceptor 102 for forwarding to the recipient 106 over the communication channel 126. In addition, when the product delivery interceptor 102 is in direct communication with the courier 110, the courier 110 also receives an indication of remuneration for one or more of: the reroute of the delivery of the same or similar product from the recipient 106 to the purchaser 104; and the reroute of the delivery of the ordered product from the purchaser 104 to the recipient 106.

Payment of the indicated remuneration to one or more of the recipient 106, the courier manager 108 and the courier 110 is done by the payment network 112. A message is sent by the purchaser 104, over payment channel 146, to the payment network 112 indicating the amount that the purchaser 104 agrees to pay for product interception (i.e. to acquire a product that is the same or identical and which is scheduled for delivery to the recipient 106). The necessary data which is required to debit a payment instrument (such as a credit card, a debit card, a banking account or a stored value card) used by the purchaser 104 to finance payment of the amount is also exchanged over the payment channel 146. The payment network 112 will check with the product delivery interceptor 102, over the communication channel 138, how the amount paid by the purchaser 104 is to be distributed between one or more of the the recipient 106, the courier manager 108 and the courier 110. A portion of this amount paid may also be kept by the product delivery interceptor 102 as an administrative fee for facilitating the product interception. When the payment distribution is known, the payment network 112 can then credit a payment instrument (such as a credit card, a debit card, a banking account or a stored value card) provided by one or more of the the recipient 106, the courier manager 108 and the courier 110 to receive their respective share. The data required to credit the provided payment instrument by one or more of the the recipient 106, the courier manager 108 and the courier 110 is exchanged over the payment channel 148, 142 and 140 respectively.

Payment flow within the payment network 112 may occur as follows. When the purchaser 104 reaches a payment page in an application supporting product interception, the purchaser 104 provides details of a payment card used to fund the product interception. The payment card details will be received by the product delivery interceptor 102 and redirected to the issuer of the payment card for authentication. Upon successful authentication, the issuer will verify that the purchaser 104 has sufficient balance in his account or sufficient credit limit. At the time of settlement, the acquirer for the merchant that supplied the product to the recipient 106 is credited the amount via a switch managed by the card scheme network utilised by the issuer of the payment card. The switch is able to identify the acquirer from past records, for example when payment made by the recipient 106 to the merchant for the product was also routed by the switch, whereby the switch would then have details such as the merchant identity and the corresponding order number. The merchant will then in turn credit the recipient 106 with an appropriate payment for participating in the product interception. This crediting of the recipient 106 may, for instance, be routed by the acquirer through the switch to an issuer of a payment card used by the recipient 106 to pay for the product. An commission is kept by one or more of the switch and the merchant, with the remainder credited to the recipient 106, whereby the amounts kept by each of the merchant, the switch and the recipient 106 depends on whether the purchaser 104 has a same or similar product for exchange with the recipient 106.

When there is a list of recipients 106 for the same or similar product, the product delivery interceptor 102 is further configured to perform one of the following before transmitting the bid for consideration by the recipient 106. In one implementation, the product delivery interceptor 102 provides, to the purchaser 104, the list of recipients of the same or similar product. The product delivery interceptor 102 then receives, from the purchaser 104, a selection of the recipient 106 to which the bid should be sent from the list of recipients 106. In another implementation, the product delivery interceptor 102 is assigns the recipient 106 to which the bid should be sent from the list of recipients 106.

Figure 2:
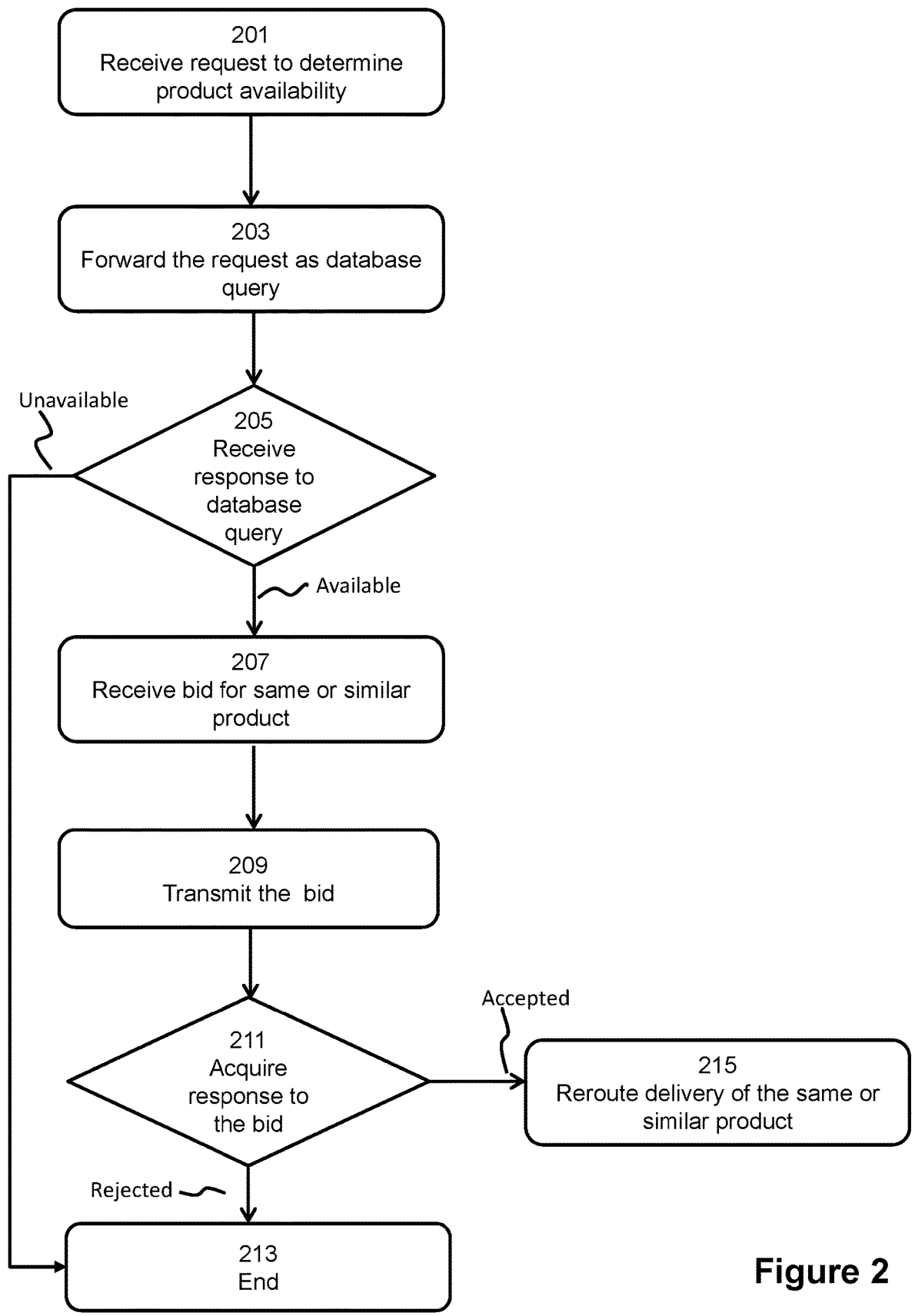
FIG. 2 shows a flowchart of a first approach of product delivery interception, implementable by the system of FIG. 3.
Figure 3:
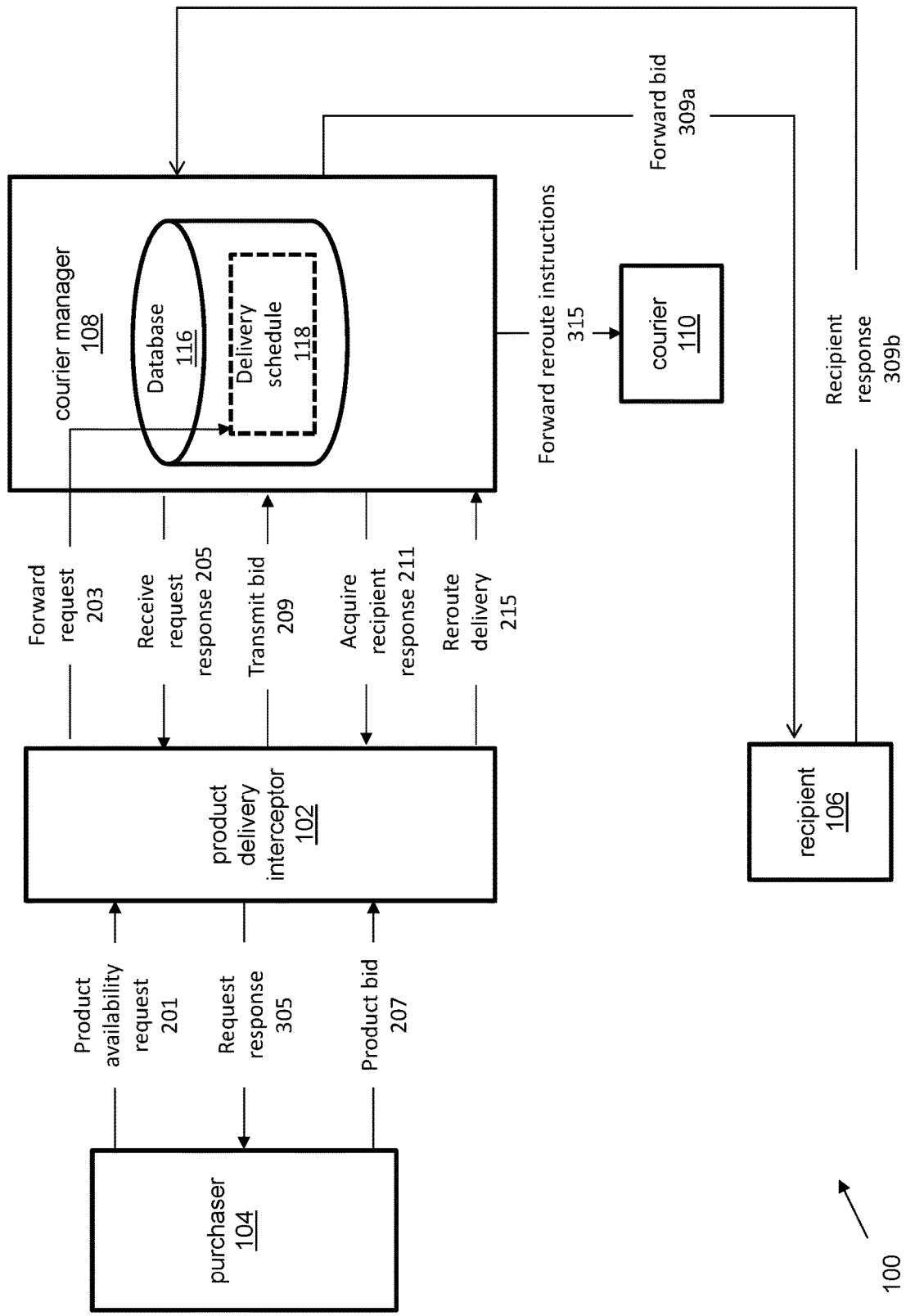
FIG. 3 shows a system for implementing the approach of product delivery in accordance with the flowchart of FIG. 2.

FIG. 2 shows a flowchart of a first approach of product delivery interception, implementable by the system 100 of FIG. 3. FIG. 3 replicates FIG. 1, but omits the payment network 112 for the sake of simplicity.

The flowchart of FIG. 2 applies to the scenario where a product delivery interceptor 102 queries a courier manager 108, such as a company that specialises in product delivery. Accordingly, FIG. 3 shows that the courier manager 108 maintains its own database 116 and delivery schedule 118.

The flowchart of FIG. 2 and the system schematic of FIG. 3 also applies in the scenario where a product availability request query (see step 201 of FIGS. 2 and 3) is sent to an e-commerce enterprise having supply chain and inventory management systems, whereby the product delivery interceptor 102 and the courier manager 108 belong to the same company. In this e-commerce enterprise scenario, all communication between the product delivery interceptor 102 and the courier manager 108 may be over a secured private network.

The flowchart of FIG. 2 is explained with reference to FIG. 3 as follows.

At step 201, the product delivery interceptor 102 receives, from the purchaser 104, a request to determine the availability of a product. The product delivery interceptor 102 then forwards the request, at step 203, to the courier manager 108 for querying its delivery schedule 118 as to whether a same or similar product is to be delivered. This request causes the delivery schedule 118 to be interrogated to identify whether there is at least one recipient 106 of the same or similar product. The courier manager 108 then responds by providing the results of the interrogation. The product delivery interceptor 102 receives, at step 205, the response to the database query. The product delivery interceptor 102 will then pass on, in step 305 (not shown in FIG. 2), the results of the database query as a response to the request to determine availability of a product, received from the purchaser 104 in the step 201.

If the result of the delivery schedule 118 interrogation indicates that no matching product was located, the flowchart will proceed to end at step 213. On the other hand, if a match is located, such as a same or similar product, the purchaser 104 will then be invited to make a bid for the same or similar product. The courier manager 108 will then receive the bid from the product delivery interceptor 102 in step 207.

The courier manager 108 will transmit, in step 209, the bid to the courier manager 108 for consideration by the recipient 106. If one or more recipients 106 of the same or similar product were identified, as a result of processing the request to determine product availability in the step 203, the courier manager 108 may forward, in step 309a (not shown in FIG. 2), the bid to each of these recipients 106 in a sequential manner. That is, should the first recipient to which the bid is first forwarded rejects the bid or does not respond within a defined time frame, the product delivery interceptor 102 will then forward the bid to another recipient. Alternatively, the courier manager 108 may forward, in step 309a, the bid to all of the identified recipients 106 and await for a response from any one of the recipients 106. The courier manager 108 will receive, in step 309b (not shown in FIG. 2), the recipient response to the bid. In step 211, the product delivery interceptor 102 will acquire the recipient response to the bid. If the recipient response indicates a rejection to the bid, the flowchart will end at the step 213. On the other hand, if the recipient response indicates that the bid is accepted, the product delivery interceptor 102 will convey to the courier manager 108, in step 215, an instruction to reroute the delivery of the same or similar product from the recipient 106 to the purchaser 104. This instruction is communicated, in step 315 (not shown in FIG. 2), to the courier 110.

Figure 4:
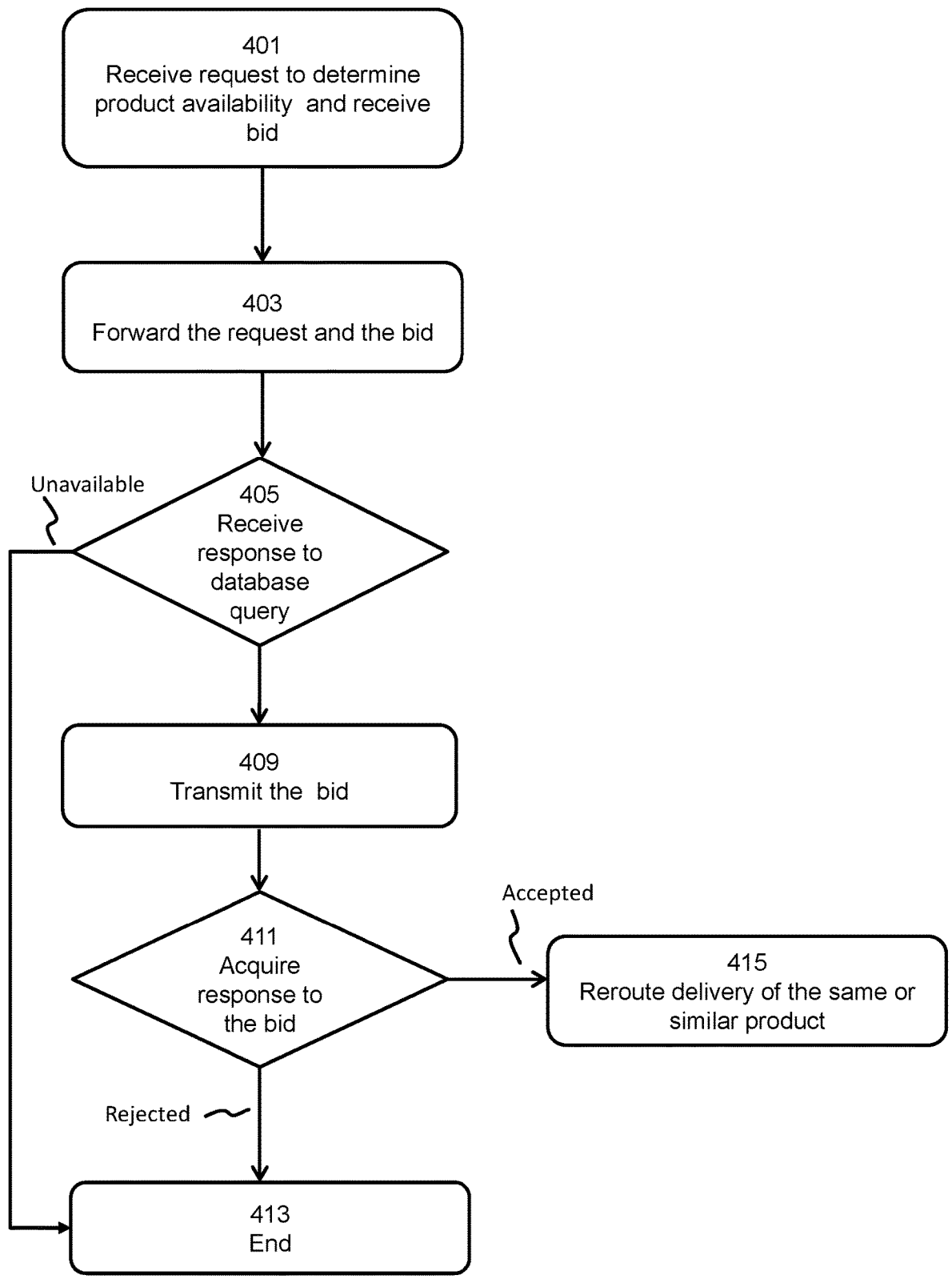
FIG. 4 shows a flowchart of a second approach of product delivery interception, implementable by the system of FIG. 5.
Figure 5:
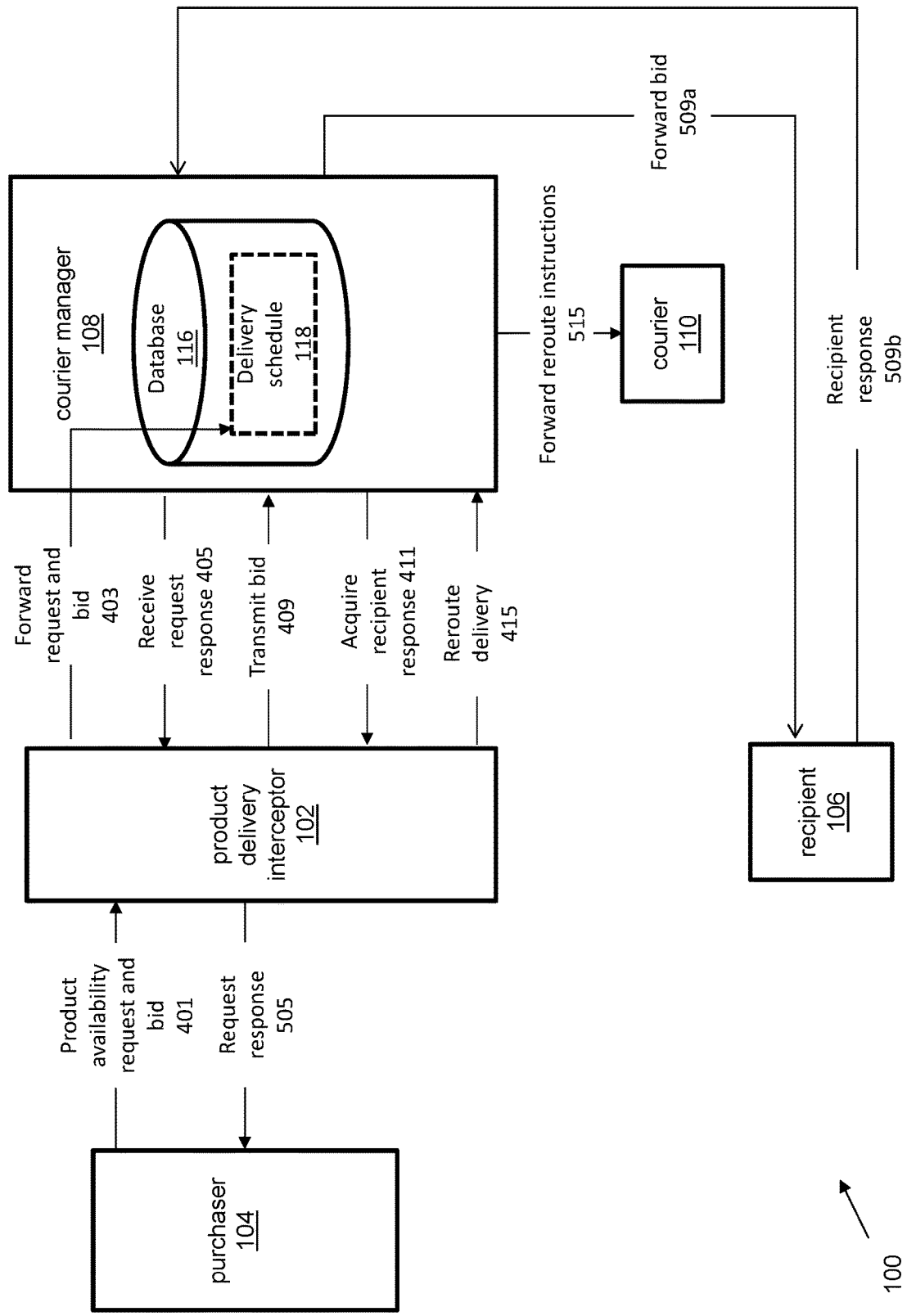
FIG. 5 shows a system for implementing the approach of product delivery in accordance with the flowchart of FIG. 4.

FIG. 4 shows a flowchart of a second approach of product delivery interception, implementable by the system 100 of FIG. 5. FIG. 5 replicates FIG. 1, but omits the payment network 112 for the sake of simplicity.

Similar to the flowchart of FIG. 2, the flowchart of FIG. 4 applies to the scenario where a product delivery interceptor 102 queries a courier manager 108, such as a company that specialises in product delivery; or the scenario where the product availability request query (see step 401 of FIGS. 4 and 5) is sent to an e-commerce enterprise having supply chain and inventory management systems.

However, one difference is that in the flowchart of FIG. 4, the product delivery interceptor 102 receives, from the purchaser 104, the request to determine availability of a product and a bid for a same or similar product in one instance, rather than in two separate instances, as per FIG. 2. The flowchart of FIG. 4 is explained with reference to FIG. 5 as follows.

At step 401, the product delivery interceptor 102 receives, from the purchaser 104, a request to determine the availability of a product and a bid for a same or similar product, in preparation for transmission when confirmation of availability of the same or similar product is obtained. The product delivery interceptor 102 then forwards the request and the bid, at step 403, to the courier manager 108 for querying its delivery schedule 118 as to whether a same or similar product is to be delivered. This request causes the delivery schedule 118 to be interrogated to identify whether there is at least one recipient 106 of the same or similar product. The courier manager 108 then responds by providing the results of the interrogation. The product delivery interceptor 102 receives, at step 405, the response to the database query. Should the same or similar product not be available, the product delivery interceptor 102 will then pass on, in step 505 (not shown in FIG. 4), the results of the unavailability as a response to the request to determine availability of a product, received from the purchaser 104 in the step 401.

If the result of the delivery schedule 118 interrogation indicates that no matching product was located, the flowchart will proceed to end at step 413. On the other hand, if a match is located, such as a same or similar product, the product delivery interceptor 102 will then transmit the bid, received in the step 401, for consideration by the recipient 106. The bid will be transmitted to the courier manager 108 in step 409.

If one or more recipients 106 of the same or similar product were identified, as a result of processing the request to determine product availability in the step 403, the courier manager 108 may forward, in step 509a (not shown in FIG. 4), the bid to each of these recipients 106 in a sequential manner. That is, should the first recipient to which the bid is first forwarded rejects the bid or does not respond within a defined time frame, the product delivery interceptor 102 will then forward the bid to another recipient. Alternatively, the courier manager 108 may forward, in step 509a, the bid to all of the identified recipients 106 and await for a response from any one of the recipients 106. The courier manager 108 will receive, in step 509b (not shown in FIG. 4), the recipient response to the bid. In step 411, the product delivery interceptor 102 will acquire the recipient response to the bid. If the recipient response indicates a rejection to the bid, the flowchart will end at the step 413. On the other hand, if the recipient response indicates that the bid is accepted, the product delivery interceptor 102 will convey to the courier manager 108, in step 415, an instruction to reroute the delivery of the same or similar product from the recipient 106 to the purchaser 104. This instruction is communicated, in step 515 (not shown in FIG. 4), to the courier 110.

In FIGS. 2 to 5, it will be appreciated that it is not essential that the purchaser 104 is awaiting delivery of an ordered product, where the ordered product is offered in exchange for the purchaser's 104 product. If so, the offer is included into the bid (step 207 in FIGS. 2 and 3; and step 401 in FIGS. 4 and 5) to the purchaser 104. When the bid includes such an offer, in addition to a monetary rebate to the recipient 106, acceptance will have the product delivery interceptor 102 convey an instruction (not shown) to the courier manager 108 to reroute delivery of the ordered product from the purchaser 104 to the recipient 106. Payment of the indicated monetary rebate to the recipient 106 and separate payment to the courier manager 108 for facilitating the rerouting of the product interception are both then effected by the payment network 112, as mentioned above.

In the scenario of FIGS. 2 to 5 the courier 110 may not be remunerated for participating in the product interception, especially if the courier 110 is an employee of the courier manager 108 and rerouting of deliveries is within their employment contract. However, FIGS. 6 and 7 illustrate a scenario where the courier 110 is remunerated for its facilitation of product interception.

Figure 6:
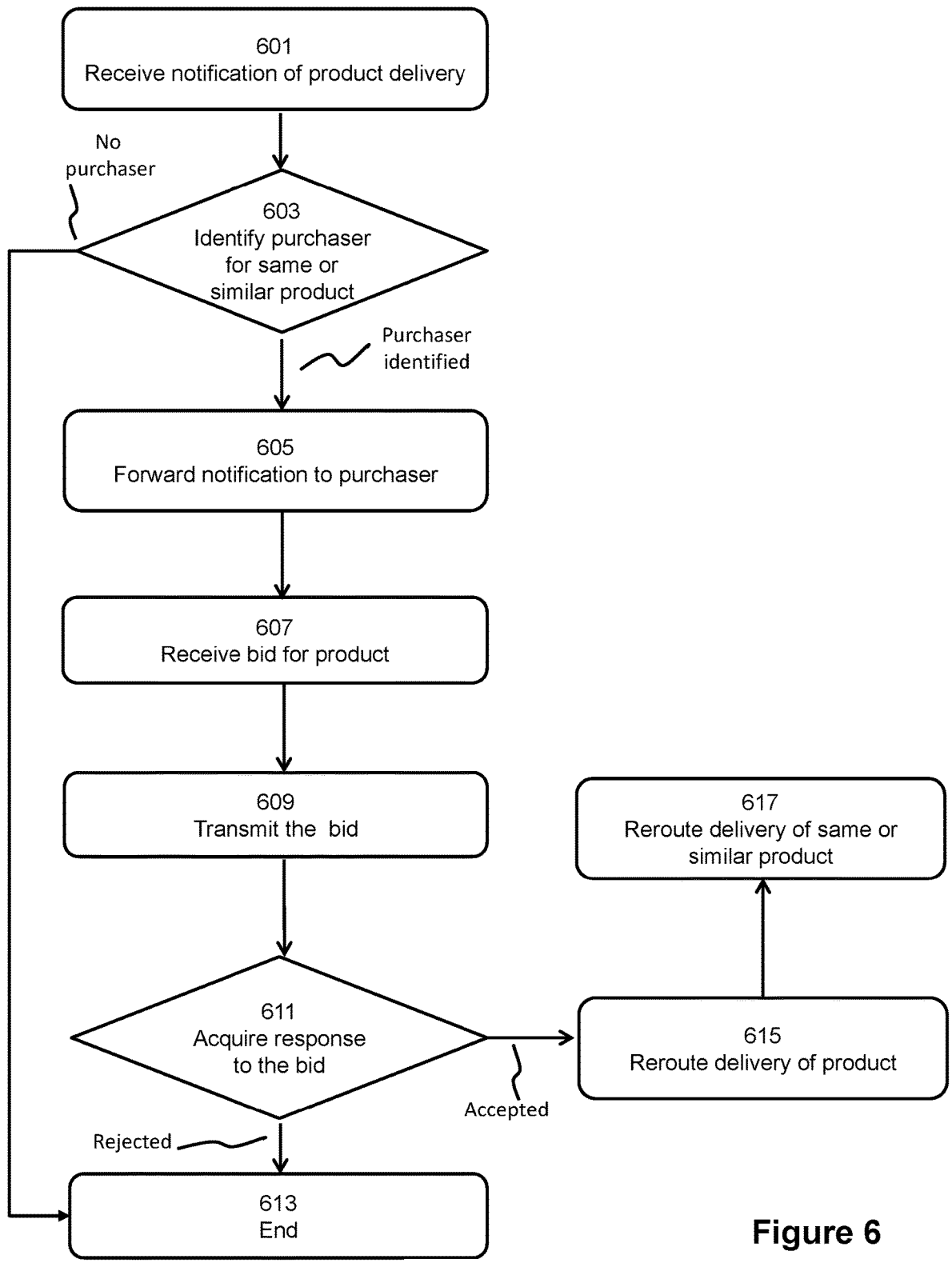
FIG. 6 shows a flowchart of a third approach of product delivery interception, implementable by the system of FIG. 7.
Figure 7:
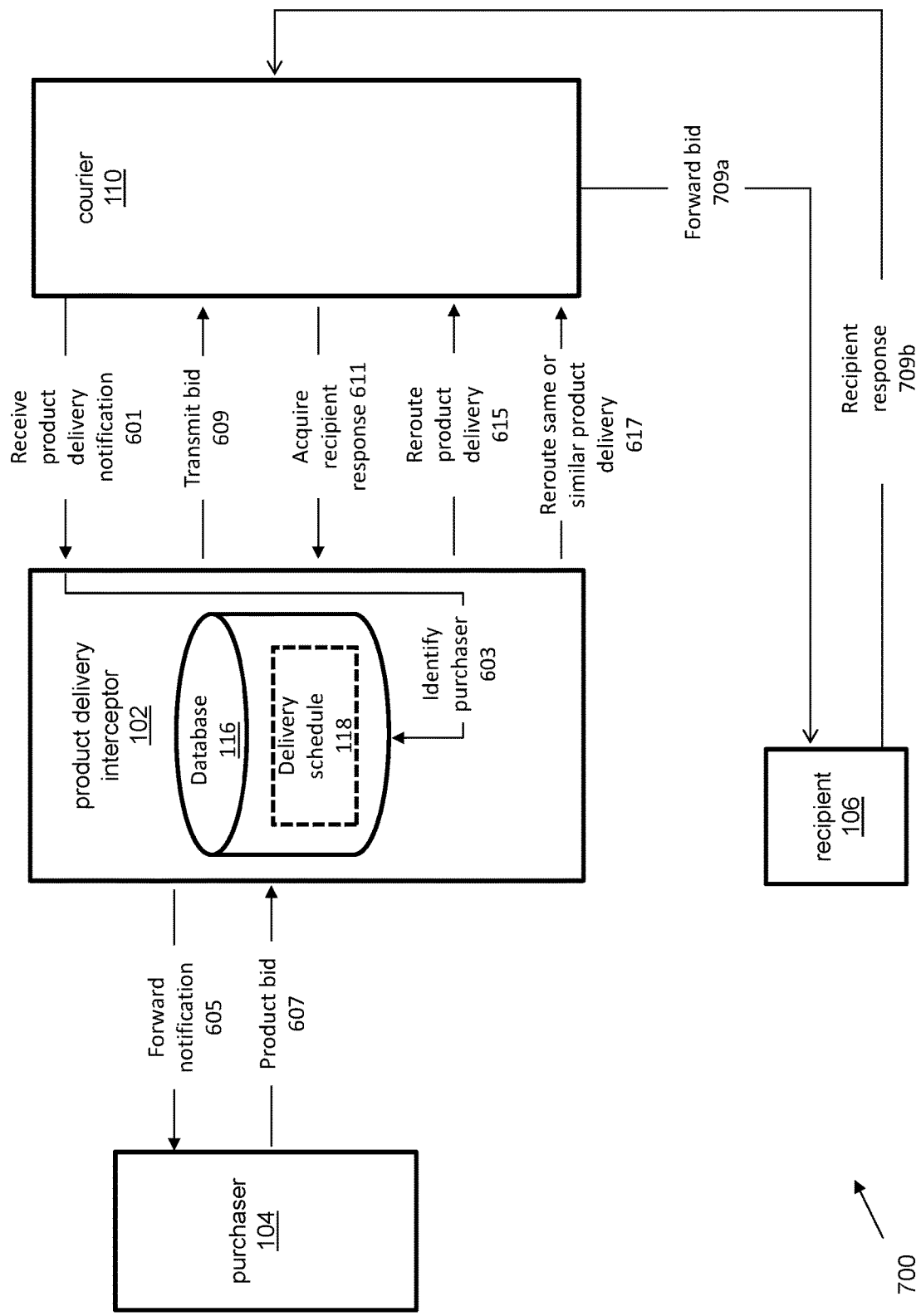
FIG. 7 shows a system for implementing the approach of product delivery in accordance with the flowchart of FIG. 6.

FIG. 6 shows a flowchart of a third approach of product delivery interception, implementable by the system 700 of FIG. 7. FIG. 7 is similar to FIG. 1, but omits the payment network 112 for the sake of simplicity. A further difference is that the system 700 of FIG. 7 omits the courier manager 108 of FIG. 1 because the product delivery interceptor 102 directly communicates with the courier 110. Accordingly, FIG. 7 shows that the product delivery interceptor 102 maintains its own database 116 and delivery schedule 118.

The flowchart of FIG. 6 and the system 700 of FIG. 7 applies to the scenario where the courier 110 is, for example, a freelance agent who performs delivery services on an assignment basis. The flowchart of FIG. 6 is explained with reference to FIG. 7 as follows.

In step 601, the product delivery interceptor 102 receives a notification from a courier 100 that a product is to be delivered to a recipient 106. Receipt of the notification causes the product delivery interceptor 102 to query its delivery schedule 118 to identify whether there is a purchaser 104 for a same or similar product. If there is no such purchaser 104, the product delivery interceptor 102 will inform the courier 110 accordingly and the flowchart will end at step 613, where the courier 110 will then proceed to deliver the product to the recipient 106.

On the other hand, if a purchaser 104 for a same or similar product is identified 603, the product delivery interceptor 102 forwards, in step 605, the notification to the purchaser 104. This notification to the purchaser 104 also includes an invitation to make a bid for the product that is to be delivered to the recipient 106. The product delivery interceptor 102 receives the bid for the product from the purchaser 104 in step 607.

The product delivery interceptor 102 transmits, in step 609, the bid to the courier 110 for consideration by the recipient 106. The courier 110 forwards the bid, in step 709a (not shown in FIG. 6), the bid to the recipient 106. The courier 110 will receive, in step 709b (not shown in FIG. 6), the recipient 106 response to the bid. In step 611, the product delivery interceptor 102 will acquire the recipient response to the bid. If the recipient response indicates a rejection to the bid, the flowchart will end at the step 613. On the other hand, if the recipient response indicates that the bid is accepted, the product delivery interceptor 102 will convey to the courier 110, in step 615, an instruction to reroute the delivery of the product from the recipient 106 to the purchaser 104.

In one implementation, the bid for the product includes a rebate to the recipient 106 and an offer to exchange the product to be delivered to the recipient 106 with the same or similar product of the purchaser 104, i.e. the product which the purchaser 104 has already ordered. Upon acceptance of the bid, the product delivery interceptor 102 conveys an instruction, in step 617, to the courier 110 to reroute delivery of the same or similar product from the purchaser 104 to the recipient. That is, the same or similar product, which is originally intended for the purchaser 104, is delivered to the recipient 106 instead.

From the above, the product delivery interceptor 102 is configured to communicate with the courier 110 to perform one or more of: the transmission of the bid for consideration by the recipient 106 (see step 609); the acquisition of the recipient response to the bid (step 611); the conveyance of the instruction to reroute the delivery of the product from the recipient 106 to the purchaser 104 if the recipient response indicates acceptance of the bid (step 615); and the conveyance of the instruction to reroute the delivery of the same or similar product from the purchaser to the recipient if the recipient response indicates acceptance of the bid. (step 617)

As mentioned above, the courier 110 receives a monetary incentive for participating in the product interception. Prior to receiving the monetary incentive, the product delivery interceptor 102 provides to the courier 110 an indication of remuneration for one or more of: the rerouting of the delivery of the same or similar product from the purchaser 104 to the recipient; and the rerouting of the delivery of the product from the recipient 106 to the purchaser 104. Payment of the indicated monetary remuneration to the courier 110 is effected by the payment network 112, as mentioned above.

In FIGS. 1 to 7, the product delivery interceptor 102 is further configured to filter requests for the product being delivered to the recipient 106 by only forwarding such requests, along with their respective bid, if the address of the recipient 106 is in proximity to an address of the purchaser 104. To perform such filtering, the request to determine product availability (201, 401) further includes data such as an address of the purchaser 104 and the database 116 further includes an address of the recipient 106 for each of the stored purchase orders. The filtering is then done depending on a delivery stage. For example, the filtering is applied if delivery to the recipient 106 is already in progress. Such a selective application of filtering helps to ensure that the purchaser 104 receives his or her desired product or something similar within the day of premium payment, while disruption on remaining deliveries for the courier 110 is minimised. It will be appreciated that to enable such filtering, the application running on the electronic computing device used by both the purchaser 104 and the recipient 106 to communicate with the product delivery interceptor 102 has geo location capability to track the delivery of the courier 110. Similarly, the corresponding application running on the electronic computing device used by the courier 110 also has geo location capability to determine the purchasers 104 and the recipients 106 who are registered with the product delivery interceptor 102, so as to avail themselves to the product interception supported by the system 100.

On the other hand, if the product is still in a warehouse, then the filtering is not applied. In the case where there is to be product exchange (i.e. the product that the purchaser 104 has ordered will be delivered to the recipient 106, while the product originally intended for the recipient 106 now goes to the purchaser 104 purchaser 104), the delivery schedule 118 of the database may be provided with the delivery date of the exchanged product, whereby already planned deliveries may be re-organised to improve usage of resources, e.g. the delivery of the exchanged product may be slotted into an already planned delivery if the address of the recipient 106 of the exchanged product is along the delivery route of the courier 110.

Figure 8:
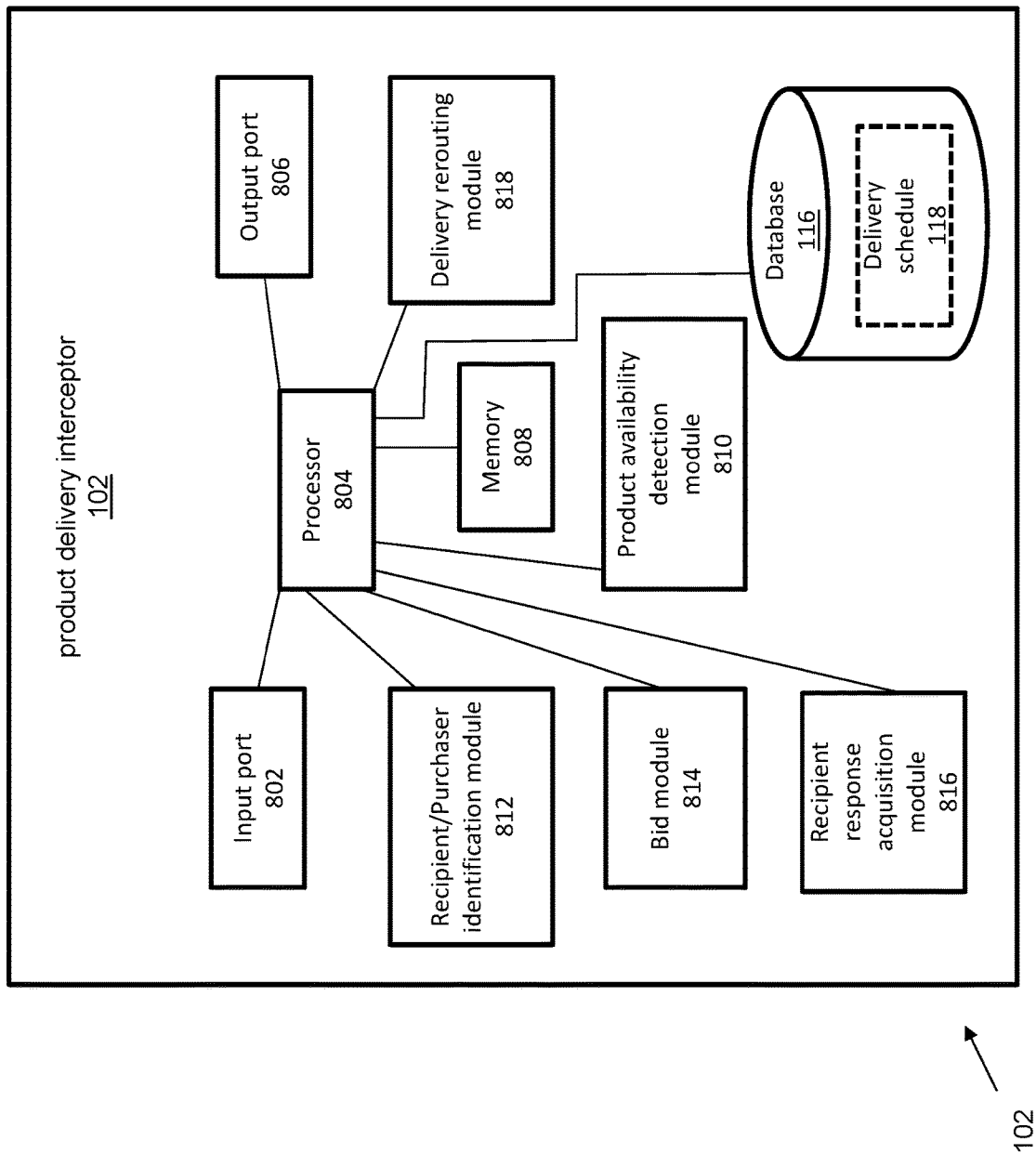
FIG. 8 provides a schematic diagram of functional modules present in the product delivery interceptor of FIGS. 1, 3, 5 and 7.

FIG. 8 provides a schematic diagram of functional modules present in the product delivery interceptor 102 of FIGS. 1, 3, 5 and 7.

The product delivery interceptor 102 further includes a processor 804, a memory 808, an input port 802, an output port 804, a product availability detection module 810, a recipient/purchaser identification module 812, a bid module 814, a recipient response acquisition module 816 and a delivery rerouting module 818.

Each of the memory 808, the input port 802, the output port 804, the product availability detection module 810, the recipient/purchaser identification module 812, the bid module 814, the recipient response acquisition module 816 and the delivery rerouting module 818 are coupled to the processor 804, so that their respective operations can be controlled by the processor 804. The memory 808 stores computer program code that the processor 804 compiles to have each of the product availability detection module 810, the recipient/purchaser identification module 812, the bid module 814, the recipient response acquisition module 816 and the delivery rerouting module 818 perform their respective functions.

Each of the product availability detection module 810, the recipient/purchaser identification module 812, the bid module 814, the recipient response acquisition module 816 and the delivery rerouting module 818 can be implemented using one or more processors present in the product delivery interceptor 102.

With reference to FIGS. 3 and 5, the product availability detection module 810 serves to receive, through the input port 802, a request made by the purchaser 104 to determine availability of a product. With reference to FIG. 7, the product availability detection module 810 serves to receive, through the input port 802, a notification from the courier 110 that a product is to be delivered to the recipient 106. The product availability detection module 810 also serves to forward, through the output port 806, the notification to the purchaser 104.

With reference to FIGS. 3 and 5, the recipient/purchaser identification module 812 serves to identify the recipient 106 of a same or similar product. With reference to FIG. 7, the recipient/purchaser identification module 812 serves to identify the purchaser 104 of a same or similar product.

With reference to FIGS. 3 and 5, the bid module 814 serves to transmit the bid for the same or similar product being delivered to the recipient 106 for consideration to the recipient 106 through the output port 806. With reference to FIG. 7, the bid module 814 serves to receive, through the input port 802, the bid from the purchaser 104 the bid for the product being delivered to the recipient 106 and transmit, through the output port 806, the bid for consideration by the recipient 106.

With reference to FIGS. 3, 5 and 7 the recipient response acquisition module 816 serves to acquire, through the input port 802, the recipient response to the bid.

With reference to FIGS. 3 and 5, the delivery rerouting module 818 serves to convey, through the output port 806, the instruction to reroute delivery of the same or similar product from the recipient 106 to the purchaser 104 if the recipient response indicates acceptance of the bid. With reference to FIG. 7, the delivery rerouting module 818 serves to convey, through the output port 806, the instruction to reroute delivery of the product from the recipient 106 to the purchaser 104 if the recipient response indicates acceptance of the bid.

Figure 9:
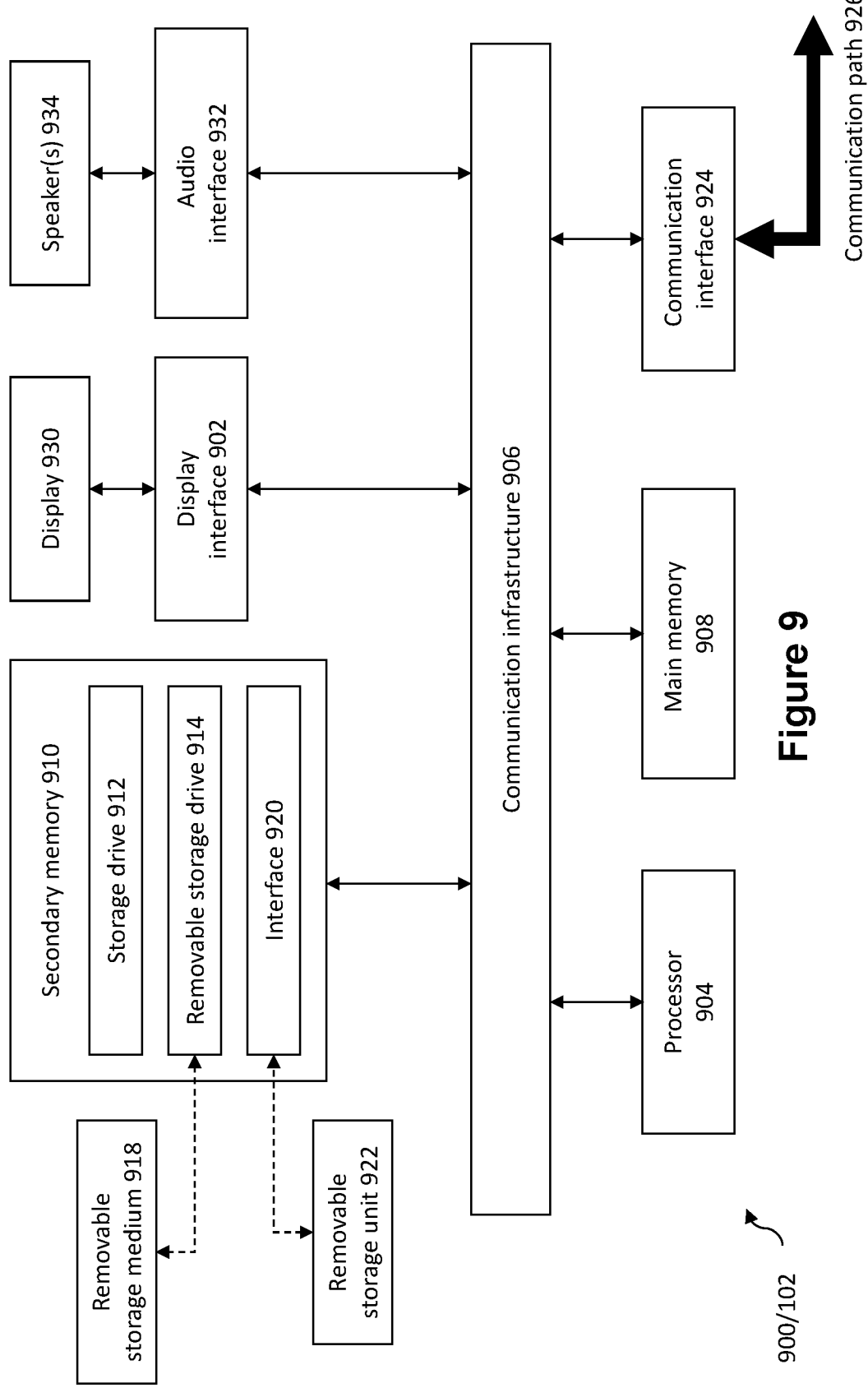
FIG. 9 shows a schematic diagram of further components in a computer device or computer system suitable for realizing the product delivery interceptor of FIG. 8.

FIG. 9 shows a schematic diagram of further components in a computer device or computer system 900 suitable for realizing the product delivery interceptor 102 of FIG. 8. The following description of the computing device 900 is provided by way of example only and is not intended to be limiting.

As shown in FIG. 9, the example computing device 900 includes a processor 904 for executing software routines. Although a single processor is shown for the sake of clarity, the computing device 900 may also include a multi-processor system. The processor 904 is connected to a communication infrastructure 906 for communication with other components of the computing device 900. The communication infrastructure 906 may include, for example, a communications bus, cross-bar, or network. The processor 904 is analogous to the processor 804 of FIG. 8. Thus the various modules of FIG. 8, the product availability detection module 810, the recipient/purchaser identification module 812, the bid module 814, the recipient response acquisition module 816 and the delivery rerouting module 818 send and receive data with the processor 904 through the communication infrastructure 906. These modules are not shown in FIG. 9 for the sake of simplicity.

The computing device 900 further includes a main memory 908, such as a random access memory (RAM), and a secondary memory 910. The main memory 908 is analogous to the memory 808 of FIG. 8. The secondary memory 910 may include, for example, a hard disk drive 912, which may be a hard disk drive, a solid state drive or a hybrid drive and/or a removable storage drive 914, which may include a magnetic tape drive, an optical disk drive, a solid state storage drive (such as a USB flash drive, a flash memory device, a solid state drive or a memory card), or the like. The removable storage drive 914 reads from and/or writes to a removable storage unit 918 in a well-known manner. The removable storage medium 918 may include magnetic tape, optical disk, non-volatile memory storage medium, or the like, which is read by and written to by removable storage drive 914. As will be appreciated by persons skilled in the relevant art(s), the removable storage medium 918 includes a computer readable storage medium having stored therein computer executable program code instructions and/or data.

In an alternative implementation, the secondary memory 910 may additionally or alternatively include other similar means for allowing computer programs or other instructions to be loaded into the computing device 900. Such means can include, for example, a removable storage unit 922 and an interface 920. Examples of a removable storage unit 922 and interface 920 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 922 and interface 920 which allow software and data to be transferred from the removable storage unit 922 to the computer system 900.

The computing device 900 also includes at least one communication interface 924, which includes the input port 802 and the output port 804 of FIG. 8. The communication interface 924 allows software and data to be transferred between computing device 900 and external devices via a communication path 926. In various embodiments, the communication interface 924 permits data to be transferred between the computing device 900 and a data communication network, such as a public data or private data communication network. The communication interface 924 may be used to exchange data between different computing devices 900 which such computing devices 900 form part an interconnected computer network. Examples of a communication interface 924 can include a modem, a network interface (such as an Ethernet card), a communication port (such as a serial, parallel, printer, GPIB, IEEE 1394, RJ45, USB), an antenna with associated circuitry and the like. The communication interface 924 may be wired or may be wireless. Software and data transferred via the communication interface 924 are in the form of signals which can be electronic, electromagnetic, optical or other signals capable of being received by communication interface 924. These signals are provided to the communication interface via the communication path 926.

As shown in FIG. 9, the computing device 900 further includes a display interface 902 which performs operations for rendering images to an associated display 930 and an audio interface 932 for performing operations for playing audio content via associated speaker(s) 934.

As used herein, the term "computer program product" may refer, in part, to removable storage medium 918, removable storage unit 922, a hard disk installed in hard disk drive 912, or a carrier wave carrying software over communication path 926 (wireless link or cable) to communication interface 924. Computer readable storage media refers to any non-transitory tangible storage medium that provides recorded instructions and/or data to the computing device 900 for execution and/or processing. Examples of such storage media include magnetic tape, CD-ROM, DVD, Blu-ray™ Disc, a hard disk drive, a ROM or integrated circuit, a solid state drive (such as a USB flash drive, a flash memory device, a solid state drive or a memory card), a hybrid drive, a magneto-optical disk, or a computer readable card such as a PCMCIA card and the like, whether or not such devices are internal or external of the computing device 900. Examples of transitory or non-tangible computer readable transmission media that may also participate in the provision of software, application programs, instructions and/or data to the computing device 900 include radio or infra-red transmission channels as well as a network connection to another computer or networked device, and the Internet or Intranets including e-mail transmissions and information recorded on Websites and the like.

The computer programs (also called computer program code) are stored in main memory 908 and/or secondary memory 910. Computer programs can also be received via the communication interface 924. Such computer programs, when executed, enable the computing device 900 to perform one or more features of embodiments discussed herein. In various embodiments, the computer programs, when executed, enable the processor 904 to perform features of the above-described embodiments. Accordingly, such computer programs represent controllers of the computer system 900.

Software may be stored in a computer program product and loaded into the computing device 900 using the removable storage drive 914, the hard disk drive 912, or the interface 920. Alternatively, the computer program product may be downloaded to the computer system 900 over the communications path 926. The software, when executed by the processor 904, causes the computing device 900 to perform functions of embodiments described herein.

It is to be understood that the embodiment of FIG. 9 is presented merely by way of example. Therefore, in some embodiments one or more features of the computing device 900 may be omitted. Also, in some embodiments, one or more features of the computing device 900 may be combined together. Additionally, in some embodiments, one or more features of the computing device 900 may be split into one or more component parts.

The communication interface 924 provides an input port and an output port of the product delivery interceptor 102. The input port is configured to receive, from a purchaser, a request to determine availability of a product. The output port is configured to transmit a bid for the product, the bid resulting from confirmation of the availability of the product, in response to the received request. The at least one memory (908, 910, 918, 922) and computer program code stored therein is configured to, with the processor, cause the product delivery interceptor 102 to: identify a recipient of the product; transmit, through the output port, the bid for consideration by the recipient; acquire, through the input port, the recipient response to the bid; and convey, through the output port, an instruction to reroute delivery of the product to the purchaser if the recipient response indicates acceptance of the bid. The address of the recipient may be in proximity to an address of the purchaser.

The product delivery interceptor 102 is further configured to, when the bid for the product includes a rebate to the recipient and an offer to exchange the product with a product ordered by the purchaser, convey, through the output port, an instruction to reroute delivery of the ordered product from the purchaser to the recipient if the recipient response indicates acceptance of the bid.

The instruction to reroute the delivery of the product and the instruction to reroute the delivery of the ordered product are transmitted to a courier.

The product delivery interceptor 102 is further configured to, when a record of the recipient is kept in a courier manager that coordinates with the courier for the delivery, communicate, through the output port, with the courier manager to perform one or more of: the identification of the recipient; the transmission of the bid for consideration by the recipient; the conveyance of the instruction to reroute the delivery of the product; and the conveyance of the instruction to reroute the delivery of the ordered product.

The product delivery interceptor 102 is further configured to communicate, through the output port, with the courier manager to provide an indication of remuneration for one or more of: the reroute of the delivery of the product from the recipient to the purchaser; and the reroute of the delivery of the ordered product from the purchaser to the recipient.

The product delivery interceptor 102 is further configured to, before transmitting the bid for consideration by the recipient, provide, to the purchaser, a list of recipients of the product; and receive, from the purchaser, a selection of the recipient for the bid from the list of recipients.

The product delivery interceptor 102 is further configured to, before transmitting the bid for consideration by the recipient, assign the recipient for the bid from a list of recipients of the product.

The input port is configured to receive a notification that a product is to be delivered to a recipient. The output port is further configured to transmit a bid for the product. The memory (908, 910, 918, 922) and the computer program code stored therein is configured to, with the at least one processor 904, cause the product delivery interceptor 102 at least to: identify a purchaser of the product; forward, through the output port, the notification to the purchaser; receive, through the input port, the bid from the purchaser; transmit, through the output port, the bid for consideration by the recipient; acquire, through the input port, the recipient response to the bid; and convey, through the output port, an instruction to reroute the delivery of the product from the recipient to the purchaser if the recipient response indicates acceptance of the bid. An address of the recipient may be in proximity to an address of the purchaser.

The product delivery interceptor 102 is further configured to, when the bid for the product includes a rebate to the recipient and an offer to exchange the product to be delivered to the recipient with an ordered product of the purchaser, convey, through the output port, an instruction to reroute delivery of the ordered product from the purchaser to the recipient if the recipient response indicates acceptance of the bid.

The product delivery interceptor 102 is further configured to, when the notification is received from a courier, communicate with the courier to perform one or more of: the transmission of the bid for consideration by the recipient; the acquisition of the recipient response to the bid; the conveyance of the instruction to reroute the delivery of the product from the recipient to the purchaser if the recipient response indicates acceptance of the bid; and the conveyance of the instruction to reroute the delivery of the ordered product from the purchaser to the recipient if the recipient response indicates acceptance of the bid.

The product delivery interceptor 102 is further configured to communicate, through the output port, with the courier to provide an indication of remuneration for one or more of: the reroute of the delivery of the ordered product from the purchaser to the recipient; and the reroute of the delivery of the product from the recipient to the purchaser.

Figure 10:
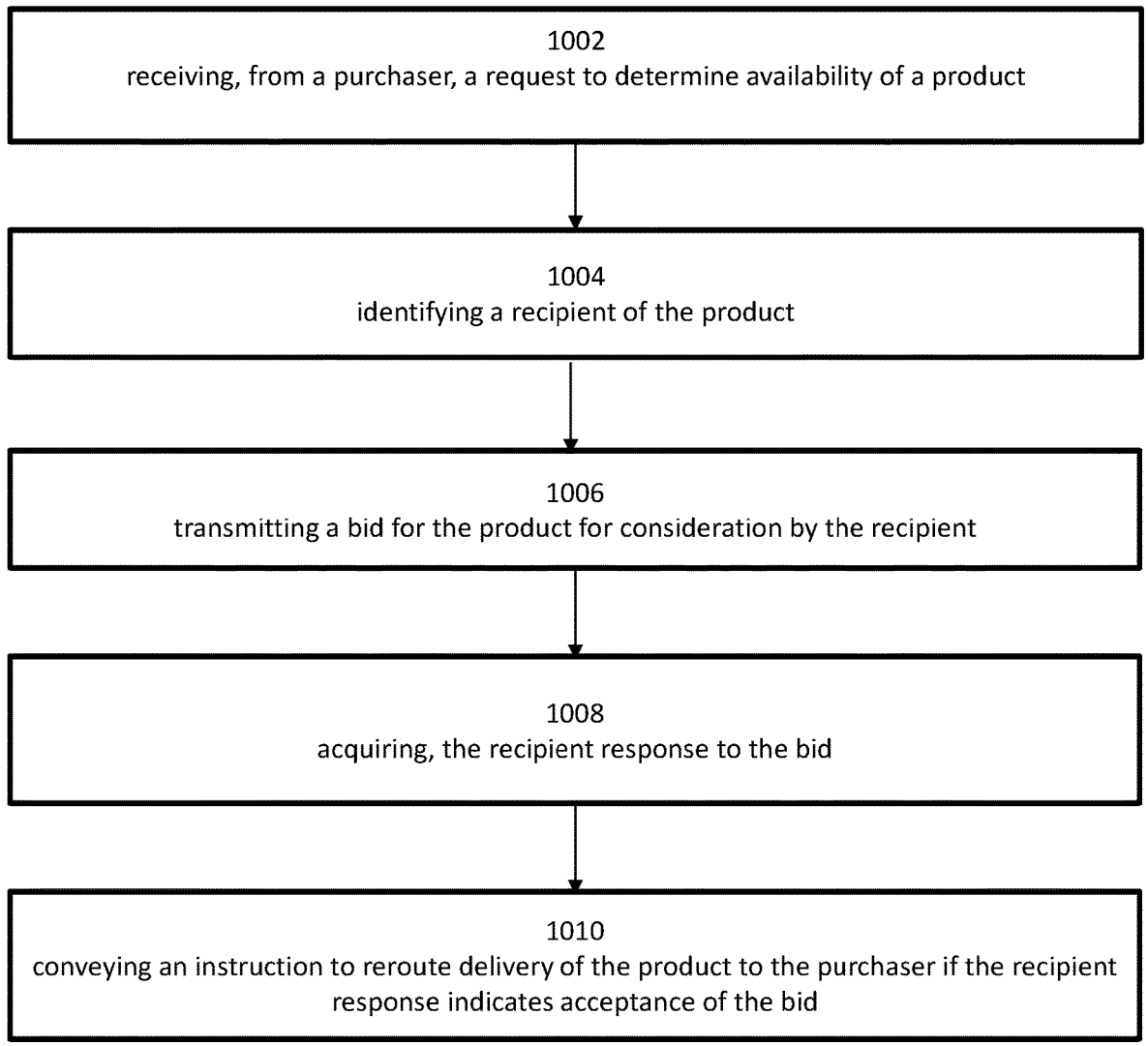
FIGS. 10 and 11 each show a flow chart for implementing a product delivery interception method in accordance with one implementation.

FIG. 10 shows a flow chart for implementing a product delivery interception method, in accordance with one implementation. The flow chart is explained with reference to the system 100 of FIG. 1.

At step 1002, a request to determine availability of a product is received from a purchaser 104. This request is received by the product delivery interceptor 102.

At step 1004, a recipient 106 of the product is identified. This is done by the product delivery interceptor 102 interrogating the delivery schedule 118 of the database 116.

At step 1006, a bid for the product for consideration by the recipient 106 is transmitted. This bid originates from the purchaser 104 and is relayed by the product delivery interceptor 102 to be eventually received by the recipient 106.

At step 1008, the recipient 106 response to the bid is acquired by the product delivery interceptor 102. This response is relayed by the product delivery interceptor 102 to the purchaser 104.

At step 1010, an instruction to reroute delivery of the product to the purchaser 104 is conveyed if the recipient 106 response indicates acceptance of the bid. This is done by the product delivery interceptor 102 sending a suitable notification to the courier 110 directly or via the courier manager 108. The courier 110 will then receive the details of the purchaser 104, such as the purchaser 104 address, for the courier 110 to complete the delivery.

Figure 11:
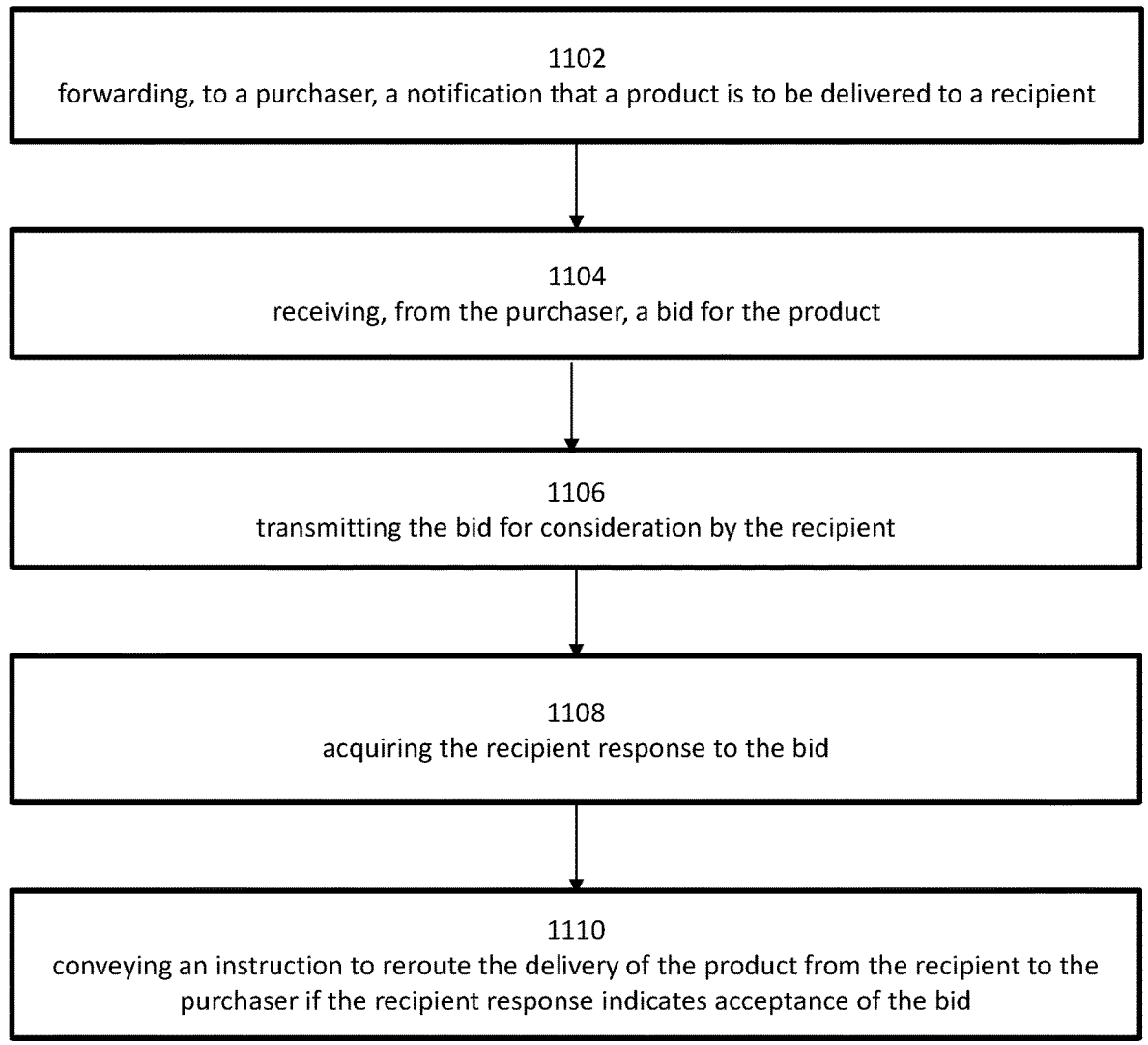

FIG. 11 shows a flow chart for implementing a product delivery interception method, in accordance with another implementation. The flow chart is explained with reference to the system 100 of FIG. 1.

At step 1102, a notification is forwarded to a purchaser 104 that a product is to be delivered to a recipient 106. This notification is forwarded by the product delivery interceptor 102, where in turn receives the notification from a courier 110 delivering the product to the recipient 106;

At step 1104, a bid for the product is received from the purchaser 104. This bid is sent by the purchaser 104 and received by the product delivery interceptor 102.

At step 1106, the bid is transmitted for consideration by the recipient 106. This is done, for example, by the product delivery interceptor 102 sending the bid to the courier 110.

At step 1108, the recipient 106 response to the bid is acquired. The recipient 106 response is received from the courier 110, which in turn relays the response to the product delivery interceptor 102.

At step 1110, an instruction to reroute the delivery of the product from the recipient 106 to the purchaser 104 is conveyed if the recipient 106 response indicates acceptance of the bid. This is done by the product delivery interceptor 102 sending a suitable notification to the courier 110. The courier 110 will then receive the details of the purchaser 104, such as the purchaser 104 address, for the courier 110 to complete the delivery.

It will be appreciated that some portions of the above description are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", "identifying", "authorizing", "verifying" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A product delivery interceptor server comprising:
at least one processor;
at least one memory including computer program code;
an input port coupled to the processor, the input port configured to prompt a purchaser, on a payment page for a product on a merchant application, that the product is planned for delivery to a recipient; and
an output port coupled to the processor, the output port configured to transmit a bid for the product by the purchaser;
the at least one memory and the computer program code configured to, with the at least one processor, cause the product delivery interceptor server to:
identify the recipient of the product;
filter requests for the product planned for delivery to the recipient based on proximity of an address of the recipient to an address of the purchaser;
transmit, through the output port to an application on an electronic computing device of the recipient, the bid for consideration by the recipient by forwarding only the filtered requests for which the address of the recipient is in proximity to the address of the purchaser;
acquire, through the input port, a recipient response to the bid; and
convey, through the output port to a courier, an instruction to reroute delivery of the product to the purchaser on determining that the recipient response indicates acceptance of the bid, wherein the courier is configured to deliver the product to the purchaser, based on the instruction, as part of an already planned delivery along a delivery route on determining that the address of the purchaser is along the delivery route.

2. The product delivery interceptor server of claim 1, wherein the bid for the product includes a rebate to the recipient and an offer to exchange the product with a product ordered by the purchaser, wherein the product delivery interceptor server is further configured to
convey, through the output port to the courier, an instruction to reroute delivery of the ordered product from the purchaser to the recipient on determining that the recipient response indicates acceptance of the bid.

3. The product delivery interceptor server of claim 2, wherein a record of the recipient is kept in a courier manager that coordinates with the courier for the delivery and wherein the product delivery interceptor server is further configured to communicate, through the output port, with the courier manager to perform one or more of:
the identification of the recipient;
the transmission of the bid, to the application on the electronic computing device of the recipient, for consideration by the recipient;
the conveyance of the instruction, to the courier, to reroute the delivery of the product to the purchaser; and
the conveyance of the instruction, to the courier, to reroute the delivery of the ordered product to the recipient.

4. The product delivery interceptor server of claim 3, wherein the product delivery interceptor server is further configured to communicate, through the output port, with the courier manager to provide an indication of remuneration for one or more of:
the reroute of the delivery of the product from the recipient to the purchaser; and
the reroute of the delivery of the ordered product from the purchaser to the recipient.

5. The product delivery interceptor server of claim 2, wherein an application on an electronic computing device of the courier has location capability to determine locations of the purchaser and the recipient, wherein the courier is configured to re-organize delivery of the ordered product from the purchaser to the recipient to be part of another already planned delivery along a delivery route on determining that the address of the recipient is along the delivery route.

6. The product delivery interceptor server of claim 1, wherein the application on the electronic computing device of the recipient and an application on an electronic computing device of the purchaser have location capability to track deliveries by the courier, wherein the filtering is enabled based on the tracked deliveries.

7. The product delivery interceptor server of claim 1, wherein the product delivery interceptor server is further configured to, before transmitting the bid for consideration by the recipient,
provide, to the purchaser, a list of recipients of the product; and
receive, from the purchaser, a selection of the recipient for the bid from the list of recipients.

8. The product delivery interceptor server of claim 1, wherein the product delivery interceptor server is further configured to, before transmitting the bid for consideration by the recipient,
assign the recipient for the bid from a list of recipients of the product.

9. The product delivery interceptor server of claim 1, wherein the product delivery interceptor server is further configured to:
automatically create starting terms for the bid including a monetary amount of the product; and
receive the bid from the purchaser, the bid including a change in the monetary amount of the product.

10. The product delivery interceptor server of claim 1, wherein the filtering is applied on determining that delivery of the product to the recipient is in progress.

11. The product delivery interceptor server of claim 1, wherein the address of the purchaser and the address of the recipient are determined using location capability of an electronic computing device of the purchaser and the electronic computing device of the recipient.

12. A product delivery interceptor server comprising:
   at least one processor;
   at least one memory including computer program code;
   an input port coupled to the processor, the input port configured to receive a notification that a product is to be delivered to a recipient; and
   an output port coupled to the processor, the output port configured to transmit a bid for the product,
   the at least one memory and the computer program code configured to, with the at least one processor, cause the product delivery interceptor server at least to:
   identify a purchaser of the product;
   filter requests for the product to be delivered to the recipient based on proximity of an address of the recipient to an address of the purchaser;
   forward, through the output port on a payment page for the product on a merchant application, the notification to the purchaser that the product is to be delivered to the recipient;
   receive, through the input port, the bid from the purchaser;
   transmit, through the output port to an application on an electronic computing device of the recipient, the bid for consideration by the recipient by forwarding only the filtered requests for which the address of the recipient is in proximity to the address of the purchaser;
   acquire, through the input port, the recipient response to the bid; and
   convey, through the output port to a courier, an instruction to reroute the delivery of the product from the recipient to the purchaser on determining that the recipient response indicates acceptance of the bid, wherein the courier is configured to deliver the product to the purchaser based on the instruction as part of an already planned delivery along a delivery route on determining that the address of the purchaser is along the delivery route.

13. The product delivery interceptor server of claim 12, wherein the bid for the product includes a rebate to the recipient and an offer to exchange the product to be delivered to the recipient with an ordered product of the purchaser, wherein the product delivery interceptor server is further configured to
   convey, through the output port to the courier, an instruction to reroute delivery of the ordered product from the purchaser to the recipient on determining that the recipient response indicates acceptance of the bid.

14. The product delivery interceptor server of claim 13, wherein the notification is received from Hall the courier and wherein the product delivery interceptor server is further configured to communicate with the courier to perform one or more of:
   the transmission of the bid for consideration by the recipient;
   the acquisition of the recipient response to the bid;
   the conveyance of the instruction to reroute the delivery of the product from the recipient to the purchaser on determining that the recipient response indicates acceptance of the bid; and
   the conveyance of the instruction to reroute the delivery of the ordered product from the purchaser to the recipient on determining that the recipient response indicates acceptance of the bid.

15. The product delivery interceptor server of claim 13, wherein the product delivery interceptor server is further configured to communicate, through the output port, with the courier to provide an indication of remuneration for one or more of:
   the reroute of the delivery of the ordered product from the purchaser to the recipient; and
   the reroute of the delivery of the product from the recipient to the purchaser.

16. The product delivery interceptor server of claim 12, wherein the application on the electronic computing device of the recipient and an application on an electronic computing device of the purchaser have location capability to track deliveries by the courier, wherein the filtering is enabled based on the tracked deliveries.

17. A product delivery interception method comprising:
   receiving, from an application on an electronic computing device of a purchaser, a request to determine availability of a product;
   identifying a recipient of the product;
   filtering requests for the product planned for delivery to the recipient based on proximity of an address of the recipient to an address of the purchaser;
   transmitting, to an application on an electronic computing device of the recipient, a bid for the product for consideration by the recipient by forwarding only the filtered requests for which the address of the recipient is in proximity to the address of the purchaser;
   acquiring, the recipient response to the bid; and
   conveying, to a courier, an instruction to reroute delivery of the product to the purchaser on determining that the recipient response indicates acceptance of the bid, wherein the courier is configured to deliver the product to the purchaser based on the instruction as part of an already planned delivery along a delivery route on determining that the address of the purchaser is along the delivery route.

18. The method of claim 17, wherein the bid for the product includes a rebate to the recipient and an offer to exchange the product with a product ordered by the purchaser, wherein the method further comprises:
   conveying, to the courier, an instruction to reroute delivery of the ordered product from the purchaser to the recipient on determining that the recipient response indicates acceptance of the bid.

19. The method of claim 17, wherein before transmitting the bid for consideration by the recipient, the method further comprises:
   providing, to the purchaser, a list of recipients of the product; and
   receiving, from the purchaser, a selection of the recipient for the bid from the list of recipients.

20. The method of claim 17, wherein before transmitting the bid for consideration by the recipient, the method further comprises:
   assigning the recipient for the bid from a list of recipients of the product.

* * * * *